United States Patent Office 3,082,201
Patented Mar. 19, 1963

3,082,201
NEW PHTHALOCYANINE DYESTUFFS CONTAINING HALOGENATED TRIAZINE NUCLEI
Eugen Johann Koller, Binningen, Switzerland, assignor to Ciba Limited, Basel, Switzerland
No Drawing. Filed Nov. 16, 1959, Ser. No. 852,943
Claims priority, application Switzerland Aug. 17, 1956
17 Claims. (Cl. 260—146)

This application is a continuation in part of my co-pending application Serial No. 677,798, filed August 12, 1957.

The present invention provides new, water-soluble phthalocyanine dyestuffs which contain at least two sulfonic acid groups and at least on substituent of the formula

in which A is a 2-amino-4-halogen-1:3:5-triazine radical, n is a whole number and preferably 1, R is a divalent organic radical, and D is an oxygen atom or a nitrogen bridge. These phthalocyanine dyestuffs are represented by the formula (1)
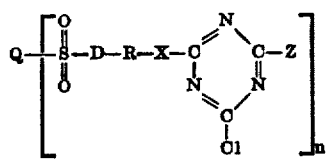

in which Q is the radical of a phthalocyanine, R is a divalent organic radical and preferably an alkylene or arylene radical, D is an oxygen atom or a nitrogen bridge, X is a bridge of the formula

in which $m$ is a whole number, preferably 1, Z is an amino group which may be substituted, and $n$ is 1 to 4, and in which the radicals Q, R and Z together contain at least two sulfonic acid groups.

The invention also provides a process for the manufacture of the aforesaid water-soluble phthalocyanine dyestuffs, wherein a phthalocyanine dyestuff containing at least one acylatable amino group is condensed with a dihalogenated 1:3:5-triazine in such manner that the condensation product formed contains at least one monohalogen-1:3:5-triazine radical of the said nature.

Phthalocyanine dyestuffs of the kind defined above suitable as starting materials for the present process are those which contain an acylatable amino group in an external nucleus, that is to say, in a nucleus linked to the phthalocyanine nucleus through a sulfonamide or sulfonic acid aryl ester group. Instead of being bound in an external nucleus of the acylatable group may be linked to an alkylene chain which is bound to the phthalocyanine molecule, for example, by an —SO₂NH-group. Either metal-free or metalliferous phthalocyanine dyestuffs of this type can be used. Especially suitable are the complex heavy metal compounds of phthalocyanines containing sulfonic acid groups, for example the iron compounds, and particularly phthalocyanines containing sulfonic acid groups in which cobalt, nickel, copper or iron, that is to say, a heavy metal having an atomic number of 27 to 30, is bound in complex union. Dyestuffs, which give especially good results, are the copperphthalocyanines which contain sulfonic acid groups or are sulfonated. Depending on the method of manufacture of the phthalocyanines the sulfonic acid groups are present in the phthalocyanine molecule in 4- or 3-position, respectively, depending on whether 4-sulfophthalic acid is used as starting material or the dyestuff is made by the sulfonation or direct sulfochlorination of phthalocyanine.

Such phthalocyanine dyestuffs, used as starting materials for the present process can be made, for example, by reacting a phthalocyanine sulfonic acid halide (such as can be made, for example, by treating a metal-free or metalliferous phthalocyanine with chlorosulfonic acid, or from the phthalocyanine-di-, -tri- or -tetra-sulfonic acids by reaction with an acid halogenating agent such as a phosphorus halide, thionyl chloride or chlorosulfonic acid) with an organic compound containing an acylatable hydroxyl or amino group, which comprises in addition to said acylatable group a further acylatable amino group or a substituent which, after reaction with the phthalocyanine sulfonic acid halide, can be converted into such a group. Suitable organic compounds of this kind are thus bifunctional organic compounds such as hydroxyamines, e.g. hydroxyarylamine, or diamines, such as 1:2-ethylene diamine, 1:6-hexamethylene diamine, and e.g. cyclic, especially aromatic diamines, such as 4:4'-diamino-diphenyl, 4:4'-diaminostilbene-2:2'-disulfonic acid, 1:4- or 1:3-diaminobenzene and above all 1:4-diaminobenzene-2-sulfonic acid and 1:3-diaminobenzene-4-sulfonic acid; also suitable are nitranilines or monoacyl derivatives of organic diamines in which case a new NH₂-group is liberated by reduction or hydrolysis after reaction with the phthalocyanine sulfonic acid cloride used. In choosing the starting materials it should be borne in mind that the resulting product must contain preferably at least two sulfonic acid groups apart from at least one acylatable amino group; for this reason the starting material decided upon is, for example, a phthalocyanine dyestuff that contains at least two sulfonic acid halide groups, which is then reacted with a hydroxyamine or diamine containing sulfonic acid groups. If the hydroxyamine or diamine chosen is free from sulfonic acid groups, it must be reacted with at most one sulfonic acid halide group of a phthalocyanine sulfonic acid halide that contains at least three such groups. Thus, for example, from 1 mol of a phthalocyanine tetra-sulfonic acid chloride and 1 or at most 2 mol of one of the said hydroxyamines or diamines free from sulfonic acid groups, or from their monoacyl derivatives, very valuable phthalocyanine dyestuffs are obtained which are suitable starting materials for the present process and contain, after hydrolysis of the unreacted sulfonic acid chloride groups, at least two SO₃H-groups and at least 1 acylatable amino group. If, on the other hand, use is made of an hydroxyamine containing sulfonic acid groups—such as 1-amino-3-hydroxybenzene-6-sulfonic acids—or a diamine containing sulfonic acid groups—such as 1:3-diaminobenzene-4-sulfonic acid, 1:4-diaminobenzene-2-sulfonic acid—or of diaminomonoazo dyestuffs containing sulfonic acid groups, or of a monoacyl derivative thereof, more than two of the sulfonic acid chloride groups present in the initial phthalocyanine may participate in the reaction.

Such phthalocyanine dyestuffs containing acylatable amino groups are condensed according to the present process at the amino group with dihalogeno-triazines of the formula (2)
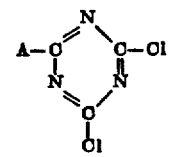

in which A is an NH₂-group or the radical of an organic amine.

The dihalogeno-triazines of this constitution can be made by known methods from cyanuric halides such as cyanuric bromide or cyanuric chloride by reacting, for example 1 mol of cyanuric chloride with 1 mol of an amino compound with or without dyestuff character. Such compounds having dyestuff character are, for example, aminoazo dyestuffs, for example those obtained by coupling a diazo compound (e.g. a diazotized aminobenzene-sulfonic acid or aminonaphthalene-sulfonic acid) with a coupling component that contains amino groups (such as cresidine, metal-toluidine, a meta-acylamino-aniline or the like), or those which are obtained by coupling a barbituric acid or a pyrazolone—more especially 1-phenyl-3-methyl-5-pyrazolone-2'-, -3'- or -4'-sulfonic acid—with a diazotized monoacyl derivative of an aromatic diamine (such as an acetylamino-aniline sulfonic acid) and hydrolyzing the resulting acylaminoazo dyestuff. As compounds having no dyestuff character may be mentioned, for example, ammonia, organic nitrogen compounds such as methylamine, dimethylamine, ethylamine, diethylamine, isopropylamine, butylamine, hexylamine, phenylamine, tolylamine, 4-chlorophenylamine, N-methylphenylamine or cyclohexylamine; furthermore β-chloroethylamine, methoxyethylamine, γ-methoxypropylamine, ethanolamines, acetamide, butyric acid amide, urea, glycine, aminocarbonic acid esters such as methyl or ethyl ester thereof, aminoactic acid ethyl ester, aminoacetamide, aminoethanesulfonic acids, 1-aminobenzene-2- or -4-methyl-sulfone, 1-aminobenzene-2:5-disulfonic acid, aminobenzoic acids and their sulfonic acids, 1-aminobenzene-2-, -3-, or -4-sulfonic acids and their sulfonamides or sulfones, phenylhydrazine and its sulfonic acids. The primary condensation products thus obtained still contain two reactive halogen atoms. Those which are free from sulfonic acid groups are condensed according to the present process only with phthalocyanine dyestuffs that contain at least two sulfonic acid groups, whereas the primary condensation products of Formula 2 containing 1 or 2 sulfonic acid groups in radical A are likewise suitable for reaction with phthalocyanine dyestuffs free from sulfonic acid groups, e.g. with the phthalocyanines containing amino groups, mentioned in U.S. Patents No. 2,479,491, by Norman Hulton Haddock et al., No. 2,430,052, by Norman Hulton Haddock et al., or with the dyestuffs containing sulfonic acid groups, which are mentioned in U.S. Patent No. 2,761,868, by Harold T. Lacey.

The condensation according to the present process of such a dihalogeno-triazine corresponding to Formula 2, with the phthalocyanine dyestuff is advantageously made in the presence of an acid-acceptor such, for example, as sodium carbonate and under conditions such that the finished product still contains at least one exchangeable halogen atom, that is to say, for example, in an organic solvent or at a relatively low temperature in an aqueous medium.

As a rule equally good results are obtained when, instead of the compound of Formula 2, cyanuric chloride is used and after condensation with the phthalocyanine dyestuff one of the chlorine atoms of the primary condensation product formed is replaced by one of the specified amines suitable for the preparation of the compounds of Formula 2 which may, but need not have dyestuff character.

The particularly valuable dyestuffs of Formula 1 can alternatively be made by a modification of the process described above, wherein a phthalocyanine sulfonic acid halide is condensed with a condensation product of the formula (3)

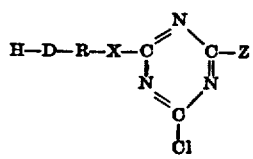

in which R, X and Z have the meanings used in defining Formula 1 and DH is an acylatable hydroxyl or amino group; for this purpose the starting materials must be chosen so that the resulting phthalocyanine condensation product contains at least two $SO_3H$ groups, e.g. by choosing such compounds of Formula 3 as contain such groups in the radicals R and/or Z, or by reacting as described only one sulfonic acid halide group of a phthalocyanine sulfonic acid halide and after the condensation hydrolyzing the remaining sulfonic acid halide groups to $SO_3H$ groups.

Especially valuable are the products obtained by condensing a phthalocyaninetri- or -tetrasulfonic acid halide with 2 to 4 mols of a condensation product of the Formula 3 wherein Z is a sulfonated arylamino group and HD—R corresponds to the formula $$H_2N-(CH_2)_x$$

where $x$ is 2, 3 or 6.

This reaction can be made in the presence of aqueous ammonia as an acid binding agent. In this case the condensation product of the copperphthalocyanine-polysulfochloride may contain sulfonamide groups besides the sulfonamide groups linked with the reactive system of the dye.

The phthalocyanine dyestuffs obtained by the present process and its modification are new; they are valuable, water-soluble dyestuffs suitable for dyeing and printing a wide variety of materials, more especially polyhydroxylated materials of fibrous structure; both synthetic fibers, made for example from regenerated cellulose or viscose, and natural materials, e.g. linen, and above all cotton, are suitable.

The phthalocyanine dyestuffs of the invention applied to the fiber by padding, printing or direct-dyeing, can be fixed by being subjected to an alkaline treatment, for example with sodium carbonate or hydroxide, with an alkaline earth metal hydroxide, with trisodium phosphate or the like, and to a heat treatment. For example, the dyeing can be performed at an elevated to slightly elevated temperature (that is to say at 50 to 100° C.) or with a dichlorotriazine dyestuff at normal temperature, e.g. at about 20 to 50° C. To exhaust the dyebath it is advisable to add simultaneously with the dyestuffs or during the dyeing process more or less neutral, especially inorganic salts, such as alkali metal chlorides or sulfates, if desired in portions. During the dyeing process the dyestuffs react with polyhydroxylated material being dyed, probably by being fixed by entering chemical bonds. The acid-acceptor can be added to the dyebath at the outset of the dyeing process; advantageously, the alkaline agent is so added that the pH value of the dyebath, which is initially weakly acid to neutral or weakly alkaline, rised continuously during the whole of the dyeing process.

Instead of preparing the dyebath by introducing the specified dyestuffs and optionally more or less neutral, inorganic salts simultaneously or successively in water, the dyestuffs and the salts can be made up into pastes or preferably dry preparations. Since some of the dyestuffs suitable for the present process are somewhat sensitive to acids and strong alkalis owing to their content of unstable substituents, it has been found advantageous if possible not to add to the dye preparation any salts that display a strongly alkaline reaction in water. On the other hand, it has been found advantageous to isolate and dry the dyestuffs in the presence of salts of weakly alkaline reaction, such as mixtures of mono- and disodium phosphates.

The present phthalocyanine dyestuffs containing at least two sulfonic acid groups and a halogenated triazine radical produce on polyhydroxylated, more especially cellulosic textile materials very valuable, strong and as a rule very full dyeings and prints of outstanding properties of fastness to wetness and very good fastness to light.

In certain cases it may be of advantage to subject the dyeings obtained by the present process to an after-treatment. Thus, it is advantageous to soap them. Such after-treatment removes any incompletely fixed dyestuff.

The following examples illustrate the invention, parts and percentages being by weight, and the relationship between parts by weight and parts by volume being the same as that between the gram and the cubic centimeter.

*Example 1*

60 parts of copper-phthalocyanine are introduced into 720 parts by volume of chlorosulfonic acid and the mixture is heated for 2 hours at 140–141°. After cooling, the reaction mixture is stirred into ice, and the precipitated sulfochloride is filtered off, thoroughly washed with ice water and further processed in the form of an aqueous paste.

The copper-phthalocyanine sulfochloride (crude product) obtained in this manner is stirred with 300 parts of chopped ice and adjusted to pH 6.5 with dilute caustic soda solution at 0 to 3° C. A solution of 15 parts of 1-amino-4-acetylaminobenzene in 580 parts by volume of acetone, as well as 50 parts by volume of pyridine are rapidly stirred into the sulfochloride. The mixture is stirred for 20 hours at room temperature and the pyridine is then completely removed by steam distillation in an alkaline solution. The dyestuff is isolated by acidification with dilute hydrochloric acid until an acid reaction to Congo has been attained. The acid, moist residue is heated for 1 hour at 100° C. with 1250 parts of water and 50 to 60 parts of concentrated sulfuric acid and then filtered. The dyestuff is dissolved in 1000 parts of hot water with the addition of some alkali and distilled with steam at a pH of 8.5 until volatile amine can no longer be detected and then isolated in usual manner with sodium chloride at a weakly alkaline reaction to brilliant yellow. It may be assumed that the product is a copper-phthalocyanine-monosulfonyl-N(para-aminophenyl)-amide-trisulfonic acid.

The sulfonic acid sulfonamide thus obtained is dissolved in 2000 parts of water in the form of its sodium salt and accurately adjusted to pH 7.0. Condensation is performed at 0 to 4° C. with 18.5 parts of cyanuric chloride (precipitated from acetone with ice water), while the pH value of the reaction solution is maintained between 7.5 and 5 by adding 1 N-sodium hydroxide solution. On completion of the condensation 50 parts of sodium bicarbonate are added and the whole is stirred for ½ hour in the cold; the dyestuff is then salted out, filtered off and dried in vacuo at 40 to 45° C.

The dyestuff thus obtained dyes cotton from an aqueous alkaline, preferably salted, bath according to Examples 27 and 25 very pure greenish blue tints which are fast to light and washing.

A similar dyestuff is obtained by preparing the copper-phthalocyanine sulfochloride described in the first paragraph of Example 3.

*Example 2*

30 parts of copper-phthalocyanine (0.05 mol) in 270 parts of chlorosulfonic acid are heated to 130–140° C. and stirred at this temperature for 4 to 5 hours. After cooling, the reaction mixture is poured on to ice. The precipitated sulfochloride is filtered off and washed on the filter with ice water to free it from acid as completely as possible. The paste is stirred in 100 parts of water and 100 parts of ice, and neutralized with sodium hydroxide solution.

67 parts (0.15 mol) of the monosodium salt of 2-chloro-4-(β-aminoethyl)-amino-6-(2′,5′-disulfophenyl)-amino-1,3,5-triazine in the form of a moist paste are stirred in 380 parts of water at 33° C., and then 25 parts by volume of concentrated ammonia are added. The resulting solution is quickly added to the sulfochloride suspension. Ice is added in sufficient quantity to bring the temperature of the reaction mixture to 10–15° C. After about 15 minutes a clear solution is obtained. Stirring is continued at room temperature for a few more hours. The dyestuff solution is then given a pH of 7 with dilute hydrochloric acid, and the dyestuff isolated by evaporating the solution under reduced pressure at 40–60° C. or by spray drying. It dyes cellulose fibers brilliant blue tints that are fast to washing.

The 2-chloro-4-(β-aminoethyl)-amino-6-(2′,5′-disulfophenyl)-amino-1,3,5-triazine can be obtained as follows:

25.3 parts (0.1 mol) of 1-aminobenzene-2,5-disulfonic acid are dissolved in 200 parts of water and dilute sodium hydroxide solution added to form a neutral solution. There is then added with stirring a solution of 18.5 parts (0.1 mol) of cyanuric chloride in 80 parts by volume of acetone and the temperature maintained between 10 and 15° C. by the addition of ice. The hydrochloric acid liberated during the condensation is neutralized by the dropwise addition of N-sodium hydroxide solution at a pH of 5–7. When the condensation is complete, the solution obtained is heated and there is added to it dropwise at 25–30° C. with stirring a solution of 6 parts (0.1 mol) of ethylene diamine in 100 parts of water so that the pH value is 7–7.3. When the addition is complete, the monosodium salt of the product of the formula

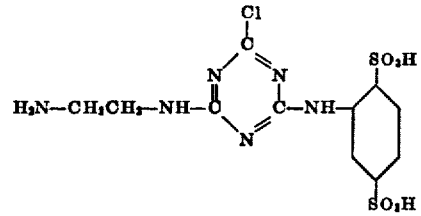

can be precipitated with 10–20% sodium chloride while cooling to 10–20° C., and isolated by filtration. There are obtained about 36 parts of the compound as the sodium salt in the form of a moist paste.

Similar dyestuffs are obtained when the sulfochloride obtained by the method described above is reacted in the manner described above with 0.075 to 0.125 mol of the afore-described aminochlorotriazine intermediate product. It is also possible to modify the aminochlorotriazine component considerably. The 1-amino-2,5-disulfonic acid may be replaced by the corresponding quantity of 1-aminobenzene-2-sulfonic acid, 1-aminobenzene-3-sulfonic acid, 1-aminobenzene-4-sulfonic acid, 1-aminobenzene-2-carboxylic acid, 2-naphthylamine-4,8-disulfonic acid or mono-(β-aminoethyl)-sulfate.

Ethylene diamine may be replaced by other alkylenediamines, such as 1,2-propylenediamine or 1,6-hexamethylene diamine.

*Example 3*

57.5 parts of copper-phthalocyanine are so stirred into 537 parts of chlorosulfonic acid that the temperature does not rise above 30° C., and the mixture is then stirred on for ½ hour at room temperature. The reaction mixture is then raised within 1½ hour to a temperature of 130 to 133° C. and maintained at that temperature for 4 hours. It is then stirred cold and, while still being stirred, it is entered into a mixture of 500 parts of water, 280 parts of sodium chloride and 3000 parts of chopped ice. The mixture is then stirred for a short time, filtered, and the filter residue is washed on the suction filter with 600 parts by volume of saturated sodium chloride solution and 200 parts of ice. In this manner a copper-phthalocyanine sulfochloride is obtained which is further processed as a moist, acid paste (crude product); most probably it is a mixture of copper-phthalocyanine-3:3′:3″-trisulfochloride-3‴-monosulfonic acid and the corresponding copper-phthalocyanine-disulfochloride-disulfonic acid.

The sulfochloride obtained in the manner described is stirred as an acid paste with 300 parts of chopped ice and adjusted to pH 6.5–7.0 at 0 to 3° C. with dilute, cold sodium hydroxide solution. The sulfochloride paste neutralized in this manner is mixed with 5 parts of sodium carbonate and a solution of 14 parts of 4-aminoformylaniline in 500 parts of water, and immediately afterwards another 15 parts of sodium carbonate are added. The reaction mixture is stirred for 24 hours at 20–23° C., acidified with hydrochloric acid, and the precipitated dye acid is filtered off. For hydrolyzis the residue (acid reaction to Congo) is suspended in 1000 parts of water, dilute sulfuric acid (containing 60 parts of concentrated $H_2SO_4$) is added in a manner such that the total volume does not exceed 1500 parts, and the whole is heated for 1 hour at 100° C. After cooling, the mixture is filtered and the residue once more suspended in water. The suspension is rendered alkaline with sodium hydroxide solution, subjected to steam distillation to remove some volatile amine, and the dyestuff is salted out with sodium chloride as its sodium salt at a pH value of 7.5.

The dyestuff is diluted in 2000 parts of water and the pH is accurately adjusted to 7.0. The dyestuff is then condensed at 0–4° C. with 18.5 parts of cyanuric chloride precipitated from acetone with ice water. During the condensation the pH value of the solution is kept at 5.0 to 7.5 by adding 1 N-sodium hydroxide solution. After completion of the condensation 200 parts by volume of 1 N-ammonia solution are added to the cold reaction solution, the whole is heated for 2 hours at 35 to 40° C., and the dyestuff is isolated from the solution which has weak alkaline reaction to brilliant yellow.

The resulting dyestuff dyes cellulose fibers by the process described in Example 25 brilliant blue tints fast to washing.

Similar dyestuffs are obtained when copper-phthalocyanine-3:4′-4″:4‴-sulfonic acid is converted into the sulfochloride, otherwise proceeding in identical manner.

*Example 4*

Copper-phthalocyanine sulfo-chloride (crude product) obtained as described in the 1st paragraph of Example 3 is stirred with 300 parts of chopped ice and adjusted at 0 to 3° C. with dilute sodium hydroxide solution to a pH value of 6.5 to 7.0. The neutralized sulfochloride is mixed with 25 parts by volume of a solution of 20 parts of calcined sodium carbonate in 100 parts of water. The whole is stirred for a short time and immediately thereafter a neutral solution, heated at 30° C., of 47.5 parts of the secondary condensation product from 1 mol of cyanuric chloride, 1 mol of 1:3-diaminobenzene-4-sulfonic acid and 1 mol of ammonia in 1200 parts of water is added, and the mixture is stirred on at room temperature. By gradually adding the remainder of the sodium carbonate solution the pH of the reaction mixture is maintained at between 6.5 and 7.8. In all, the mixture is stirred for 24 hours and then heated at 35 to 40° C. When the pH value has remained constant for 1 to 2 hours without any further addition of dilute sodium hydroxide solution, the dyestuff is salted out with sodium chloride. The dyestuff thus obtained dyes cellulose fibers by the process described in Example 26 brilliant blue tints that are fast to washing.

Similar dyestuffs are obtained when the sulfochloride is reacted with a smaller quantity, that is to say about 31 parts, or with a larger quantity, for example 60 parts, of the cyanuric chloride condensation product used in the present example.

The secondary condensation product from cyanuric chloride, 1:3-diaminobenzene-4-sulfonic acid and ammonia, can be replaced by the secondary condensation product from 1 mol of cyanuric chloride, 1 mol of 1:4-diaminobenzene-2-sulfonic acid and 1 mol of ammonia, thereby a similar dyestuff is obtained.

*Example 5*

A sulfochloride paste which has been obtained from 57.5 parts of copper-phthalocyanine according to the 1st paragraph of Example 3 and neutralized as described in the 1st paragraph of Example 4 is mixed with a solution of 13.6 parts of 4-aminoformylaniline in 500 parts of water, and 20 parts of sodium carbonate are strewn in. This reaction mixture is stirred for 24 hours at room temperature. The dyestuff is then isolated in the cold with hydrochloric acid and filtered off.

To hydrolyse the formyl group, the dye is converted into its sodium salt and sufficient water is added to produce a total volume not exceeding 1500 parts; 60 parts of solid sodium hydroxide are added to the cold solution, and the whole is finally heated for 45 to 60 minutes at 85 to 90° C. The excess of alkali is neutralized with hydrochloric acid, the whole is subjected to steam distillation in an alkaline solution, and the dyestuff is isolated as its sodium salt by adding sodiumchloride at a pH of 7.5.

To condense with cyanuric chloride, the dyestuff thus obtained is dissolved in 2000 parts of water and the solution is adjusted at ph=7.0. Condensation is performed with 17.0 parts of finely divided cyanuric chloride at 0 to 4° C. as described in Example 1. On completion of the condensation, 25 parts of sodium bicarbonate are added, and the whole is stirred on for ½ hour. The dyestuff is isolated as described in the preceding examples and dried at 45° C.

When the dyestuff is treated with ammonia, a dyestuff is obtained which yields on cellulose fibers very similar blue tints by the dyeing process described in examples 25 and 26. This ammonia treatment is conducted as follows:

About 118 parts (=0.1 mol) of the dyestuff are dissolved in 2000 parts of cold water, 200 parts by volume of 1 N-ammonia solution are added, and the whole is stirred for 3 hours at 35 to 40° C. The dyestuff thus formed is isolated in usual manner.

*Example 6*

Copper-phthalocyanine sulfochloride obtained from 60 parts of copper-phthalocyanine as described in the first paragraph of Example 3 is stirred with 100 parts of chopped ice and 100 parts of water into a very fine suspension and the pH value adjusted with dilute sodium hydroxide solution to 7.0, the temperature not being allowed to exceed +5° C.

At the same time a neutral suspension heated to 20° C. of 47.5 parts of the secondary condensation product from 1 mol of cyanuric chloride, 1 mol of 1:3-diamino-benzene-4-sulfonic acid and 1 mol of ammonia is prepared, the total volume of the amine component being 950 parts by volume.

5.0 parts of calcined sodium carbonate are added, while stirring well to the neutralized sulfochloride paste at the same time as the aminochloro triazine suspension. The temperature rises from 5° C. to 13 to 14° C. As soon as the pH value of the reaction mixture has attained 7.0 to 7.2, a further 15 to 16 parts of sodium carbonate are added. The whole is stirred from 5 to 7 hours at 20 to 21° C., 20 parts by volume of concentrated ammonia are added, and stirring is continued for 12 to 14 hours at room temperature.

If necessary, the ammoniacal reaction solution is brought back to a pH value of 7.5 to 7.7 by cautiously adding dilute hydrochloric acid. After heating the whole for one hour at 30 to 35° C., the dyestuff is isolated with sodium chloride from the reaction medium brought to weakly alkaline reaction to brilliant yellow.

*Example 7*

In the course of 15 minutes, 30 parts of copper-phthalocyanine are introduced into 233 parts of chlorosulfonic acid. The mixture is heated to 70 to 75° C. for 1 hour while stirring, and the temperature then raised in the course of an hour and a half to 130 to 135° C. The mixture is stirred at this temperature for 4 hours. After cooling to 80° C., there are added dropwise in the course of 1 hour 95 parts of thionyl chloride, and stirring is continued for another hour at 70 to 75° C. and for another hour at 85 to 90° C. When the reaction mass has cooled to room temperature, it is poured on to ice. The precipitated copper-phthalocyanine-tetrasulfochloride is filtered with suction and washed with water to neutrality. The resulting paste is stirred in 250 parts of ice water.

67 parts (0.15 mol) of the moist paste of the monosodium salt of 2-chloro-4-(β-aminoethyl)-amino-6-(2,5-disulfo)-phenylamino-triazine-1,3,5 the production of which is described in Example 2 are stirred in 380 parts of water at 35° C. and admixed with 40 parts by volume of concentrated ammonia solution. The mixture is added to the sulfochloride suspension. At the outset the temperature must be 15-20° C. After 1 hour it is raised to 25 to 30° C. The reaction mass is stirred until a clear solution is obtained. After that, it is stirred at room temperature for several hours. During the condensation, the reaction mass should have an alkaline reaction. If necessary, more ammonia solution has to be added. At the end, the solution is given a pH of 7, and the dyestuff is isolated by evaporating the reaction solution at 40 to 60° C. or by spray-drying it at 180 to 200° C.

The product obtained dyes cellulose fibers brilliant blue tints that are fast to washing.

Similar dyestuffs are obtained when the copper-phthalocyanine is reacted with 2 or 4 molecular equivalents of the aminochlorotriazine intermediate product.

*Example 8*

The sulfochloride obtained as described in the 1st paragraph of Example 3 from 28.75 parts of copper-phthalocyanine is neutralized at 0 to 3° C. as described in the 1st paragraph of Example 4.

35.5 parts of the product of the formula

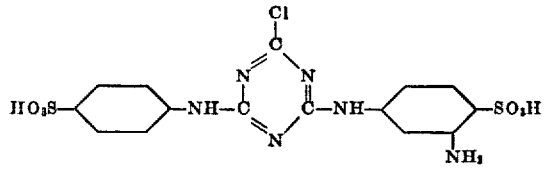

are dissolved in water with the addition of 1 N-sodium hydroxide solution at a pH of 7.5 to produce a volume of 550 parts. This amino-chlorotriazine solution is added to the neutralized, vigorously stirred sulfochloride suspension. By adding 8 parts of anhydrous sodium carbonate in 4 portions the pH value is kept constantly above 7.0. After 8 hours reaction at 18 to 21° C. 10 parts by volume of concentrated ammonia are added, and the whole is stirred for another 10 hours at room temperature, heated at a pH of 7.5 to 7.7 for 1 hour at 35 to 40° C., and the dyestuff is then isolated in usual manner.

When the condensation is performed, instead of the product of the formula in the 2nd paragraph above, with 25.5 parts of the product of the formula and following the same procedure

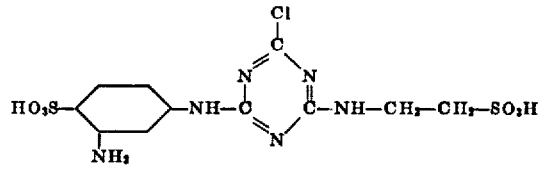

after salting out with potassium chloride furnished a dyestuff, which dyes cotton by the process described in Example 28 brilliant blue tints fast to washing.

*Example 9*

Starting from 30 parts of copper-phthalocyanine the copper-phthalocyanine-sulfochloride mixture described in the 1st paragraph of Example 3 is prepared as described in that passage.

The resulting sulfochloride (crude product) is stirred into a very fine suspension with 50 parts of chopped ice and 50 parts of water and adjusted at 0 to 5° C. with dilute sodium hydroxide solution to pH 7.3.

At the same time 7.15 parts of N-formyl-p-aminophenol are dissolved in 250 parts of cold water with the addition of 52 parts by volume of 1 N-sodium hydroxide solution. This solution is tipped into the neutralized sulfochloride and 4 to 5 parts of anhydrous sodium carbonate are then added to the mixture. The reaction mixture is stirred for 24 hours at 20 to 22° C. At 35° C. hydrochloric acid is then added to produce a distinct acid reaction to Congo, and the precipitated dye acid is filtered off. To hydrolyse it, it is stirred in the form of a moist, acid paste with 400 parts by volume of 1 N-hydrochloric acid and heated for 2 hours at 85 to 90° C. After cooling, the dyestuff is once again filtered off, suspended in 1000 parts of hot water and rendered alkaline (pH 7.8) with dilute sodium hydroxide solution. The dystuff solution is heated to 35 to 40° C.; after it has retained a pH of 7.6 for 1½ hours without any more alkali being added, the dyestuff is salted out with sodium chloride.

This dyestuff is dissolved in 1200 parts of water and condensed at 0 to 4° C. with 9.3 parts of cyanuric chloride (which has been precipitated from acetone with ice water), during which operation the pH is maintained at between 5.5 and 7.8 by adding 1 N-sodium hydroxide solution.

On completion of the condensation 200 parts by volume of 1 N-ammonia solution are added to the cold reaction solution, the whole is heated for 2 hours at 35 to 40° C., and the dyestuff is isolated from the solution which has weak alkaline reaction to brilliant yellow.

*Example 10*

In the course of 15 minutes 28 parts of chlorosulfonic acid are added dropwise at 120° C. to a vigorously stirred melt of 250 parts of anhydrous aluminum chloride and 40 parts of sodium chloride, and the whole is stirred for a further 10 minutes at 120° C. In the course of 25 minutes 19.7 parts of dry tetrasodium salt of copper-phthalocyanine-tetrasulfonic acid (prepared by alkaline hydrolysis of copper-phthalocyanine-3:3':3":3'''-tetrasulfochloride) are added. The temperature of the reaction mixture is raised within 45 to 50 minutes to 160 to 161° C., and it is stirred for 3 hours at that temperature. While stirring, the mixture is allowed to cool to 125 to 130° C. and then poured on to a mixture of ice and water, suctioned off and the filter residue is washed on the filter with 500 parts by volume of sodium chloride solution of about 5 percent strength and dried in vacuo at 70° C. A chlorinated copper-phthalocyanine-tetrasulfonic acid is obtained.

For conversion into the sulfochloride the product thus obtained is stirred into 320 parts of chlorosulfonic acid and heated for 4–5 hours at 100 to 103° C. The cooled reaction mixture is poured on to sodium chloride and chopped ice, stirred for a short time and then suction-filtered. The residue is washed on the filter with 200 parts by volume of sodium chloride solution of 10 percent strength. The sulfochloride thus prepared is stirred into a fine paste with 60 parts of ice and adjusted at 0 to 3° C. with dilute sodium hydroxide solution to pH=7.0 to 7.5. This neutralized sulfochloride is mixed with 4 parts of calcined sodium carbonate and then with 2.8 parts of para-amino-formylanilide dissolved in 100 parts of water. The whole is stirred for 20 to 24 hours at room temperature and acidified at 40° C. with dilute hydrochloric acid to attain an acid reaction to Congo. To hydrolyse the still moist, acid dye it is pasted with 200 parts of water, 10 to 12 parts of concentrated sulfuric acid in 50 parts of water are added, and the whole is vigorously stirred for 1 hour at 100° C. The dyestuff is then filtered off and isolated in the form of its sodium salt as described in the 2nd paragraph of Example 1.

The resulting chlorinated copper-phthalocyanine-sulfonyl-(para-aminophenyl)-amide-sulfonic acid is then condensed with cyanuric chloride as described in the 3rd paragraph of Example 1. On completion of the condensation the reaction mixture is rendered alkaline with bicarbonate and stirred on for ½ hour at 5° C.; the dyestuff is then salted out with sodium chloride and dried in vacuo at 45 to 50° C.

When this dyestuff is treated with ammonia, a monochloro-triazine dyestuff is obtained; 0.01 mol thereof is dissolved in 500 parts of water, 20 parts by volume of 2 N-ammonia solution are added, and the mixture is stirred for about 5 hours at 35 to 40° C. The dyestuff is isolated and dried in the usual manner.

*Example 11*

19.7 parts of sodium copper-phthalocyanine-4:4':4":4'''-tetrasulfonate are stirred with cooling into 200 parts by volume of chlorosulfonic acid, and the mixture is stirred for 15 minutes at room temperature. Inside of 1 hour the reaction mixture is raised to an internal temperature of 130 to 132° C. and stirred on at that temperature for 45 to 60 minutes. The cooled sulfochloride is poured on to 1400 parts of chopped ice, 200 parts of water and 170 parts of sodium chloride, filtered, and washed with a mixture of 300 parts by volume of saturated sodium chloride solution and about 100 parts of ice.

This sulfochloride is thoroughly stirred as an acid, moist paste with 30 parts of water and 30 parts of ice and then adjusted with dilute sodium hydroxide solution at 0 to 3° C. to a pH value of 7.5. The sulfochloride neutralized in this manner is immediately mixed with a neutral suspension, having a temperature of 20° C., of 9.5 parts of the secondary condensation product from 1 mol of cyanuric chloride, 1 mol of 1:3-diaminobenzene-4-sulfonic acid and 1 mol of ammonia in water, the total volume of the suspension being 180 parts by volume. The reaction mixture is stirred at 20° C., a total of 6 parts of calcined sodium carbonate is strewn in in 5 portions so that the pH of the reaction mixture does not drop below 7.0. After 8 to 9 hours' reaction at 20° C. 5 parts by volume of concentrated ammonia are added, and the mixture is stirred for another 14 hours at room temperature, during which some of the unhydrolysed sulfochloride groups are converted into sulfonamide groups. The alkalinity is reduced to 7.7 by means of dilute hydrochloric acid, the whole is heated at 35°, and the dyestuff is salted out with sodium chloride.

On cotton brilliant blue prints are obtained which are so fixed as to be fast to washing.

*Example 12*

19.7 parts of sodium copper-phthalocyanine-3:4':4":4'''-tetrasulfonate are stirred into 160 parts by volume of chlorosulfonic acid in a manner such that the temperature is prevented from rising above 20° C. The mixture is then stirred for 15 minutes at room temperature and raised in the course of 1 hour to an internal temperature of 130 to 132° C., kept at that temperature for 1 hour, allowed to cool, and the sulfochlorination mixture is poured on to 1400 parts of ice, 170 parts of sodium chloride and 200 parts of water. The sulfochloride formed is filtered off and washed with a mixture of 300 parts by volume of saturated sodium chloride solution and 100 parts of ice.

The sulfochloride is stirred with 30 parts of water and 30 parts of ice into a very fine paste and adjusted at 0 to 3° C. with dilute sodium hydroxide solution to a pH of 7.5. This neutralized sulfochloride is then mixed with a neutral suspension, heated at 20° C., of 9.5 parts of the secondary condensation product from 1 mol of cyanuric chloride, 1 mol of 1:3-diaminobenzene-4-sulfonic acid and 1 mol of ammonia in water, the total volume of the suspension being 180 parts by volume. This reaction mixture is stirred at room temperature for 7 hours while strewing in 6 parts of calcined sodium carbonate in 5 portions so that the pH is prevented from dropping below 7.0. After that time, 5 parts by volume of concentrated ammonia are added and the whole is stirred on for 12 hours at room temperature. The alkalinity is reduced to 7.7 by adding dilute hydrochloric acid, and the dyestuff is isolated with sodium chloride and dried at 60° C. in vacuo.

On cotton this dyestuff produces brilliant blue prints which are so fixed as to be fast to washing.

*Example 13*

40.8 parts of copper-phthalocyanine-3:3':3"-trisulfonic acid (obtained by treating copper-phthalocyanine with oleum) are so stirred into 250 parts of chlorosulfonic acid that the temperature is prevented from rising above 25 to 30° C. The whole is then heated to 80° C. and stirred at that temperature for ½ hour. In the course of 1 hour 56 parts by volume of thionyl chloride are added dropwise, with the temperature dropping to 73° C. When all the thionyl chloride has been added, the mixture is heated for 75 minutes at 80 to 82° C. The cooled reaction mass is poured on to ice, filtered and then thoroughly washed with water. The sulfochloride formed is obtained in the form of a weakly acid, aqueous paste.

Half of the sulfochloride thus obtained is intimately stirred with 25 parts of ice and 25 parts of water, and with dilute sodium hydroxide solution adjusted at 0 to 4° C. to a pH of 7.5.

At the same time a suspension is prepared from 11.8 parts of the secondary condensation product from 1 mol of cyanuric chloride, 1 mol of 1:3-diaminobenzene-4-sulfonic acid and 1 mol of ammonia in water, said suspension having been cautiously neutralized with the sodium hydroxide solution and adjusted at 20° C. to a total volume of 250 parts by volume.

The neutralized sulfochloride is mixed with 2 parts of calcined sodium carbonate, and the suspension of the aminotrichlorotriazine component is tipped in. The whole is stirred for 20 hours at 30° C. and another 3–4 parts of calcined sodium carbonate are added in 3 portions as soon as the pH of the reaction mixture has dropped below 7.0. When the pH has remained constant at 30 to 35° C. for 1 hour without any further addition of alkali, the dyestuff is isolated with sodium chloride, washed with salt water and dried at 60° C. in vacuo.

The dyestuff dyes cotton by the process described in Example 28 brilliant blue tints.

*Example 14*

The sulfochloride (crude product) obtained from 30 parts of copper-phthalocyanine as described in the 1st paragraph of Example 3 is stirred in the usual manner with 50 parts of water and 50 parts of ice and neutralized with dilute sodium hydroxide solution.

A suspension is prepared by pasting 19.6 parts of the secondary condensation product from 1 mol of cyanuric chloride, 1 mol of 1:3-diaminobenzene-4-sulfonic acid and 1 mol of aniline with 200 parts of water and the pH is adjusted with 1 N-sodium hydroxide solution to 7.5. The final volume at 20° C. should be about 450 parts by volume.

13.5 parts of calcined sodium carbonate are strewn into the well-stirred, neutralized sulfochloride suspension, and at the same time the aminochlorotriazine component is added. The mixture is stirred for 24 hours at 20 to 22° C., then heated at 35 to 40° C., and the dyestuff is isolated as described in the 1st paragraph of Example 4.

A dyestuff is thus obtained which dyes cellulose fibers by the process described in Example 26 brilliant greenish blue tints which are so fixed as to be fast to washing.

*Example 15*

A sulfochloride paste prepared from 60 parts of copper-phthalocyanine as described in the 1st paragraph of Example 3 and neutralized as described in the 1st paragraph of Example 4 is mixed with 15 parts of 1-amino-4- acetylaminobenzene dissolved in 580 parts of acetone and 50 parts of pyridine. After 24 hours' reaction at room temperature the pyridine is completely removed by steam distillation in an alkaline solution. At 40° C. concentrated hydrochloric acid is added to the mixture to render it acid to Congo. The precipitated dye is then filtered and suspended in about 900 parts of water, dissolved by adding sodium hydroxide solution and rendered alkaline to brilliant yellow. Hydrolysis is performed by adding 90 parts of solid sodium hydroxide, the volume is made up to 1500 parts, and the whole is heated for 2 hours at 90° C. The dyestuff is once more precipitated with concentrated hydrochloric acid, again dissolved with the addition of alkali, and steam is introduced until all the amine volatile with steam has been removed. The dyestuff is salted out with sodium chloride at a pH value of 7.2–7.5. The product so obtained is probably a copper-phthalocyanine-trisulfonic acid monosulfonyl-N-(p-aminophenyl)-amide.

3.78 parts of cyanuric chloride are dissolved in 100 parts of acetone and while being thoroughly stirred and cooled mixed with a solution (0 to 2° C.) of 3.46 parts of 1-amino-4-benzenesulfonic acid (in the form of its sodium salt) in 200 parts of water. At the same time 20 parts by volume of 1 N-sodium hydroxide solution are added dropwise at 0 to 2° C. to keep the pH of the reaction mixture at 5 to 7. Condensation progresses very rapidly.

This condensation product is added to a neutral solution of 0.02 mol of copper-phthalocyanine-sulfonic acid-monosulfonyl-N(para-aminophenyl)-amide in 500 parts of water. The mixture is heated at 35 to 40° C. and, as in the first condensation, its alkalinity is maintained at a pH value between 5 and 7.5 by the dropwise addition of 1 N-sodium hydroxide solution. After 1½ to 2 hours the condensation is complete, and the dyestuff is salted out with sodium chloride from a solution weakly alkaline to brilliant yellow paper.

By the process described in Example 28 pure blue tints are obtained on cotton which are fast to washing.

*Example 16*

5.15 parts of 4-amino-4'-hydroxy-1:1'-azobenzene-5'-carboxylic acid (in the form of its sodium salt) are dissolved in 200 parts of water and 100 parts of acetone and cooled to 0 to 2° C. This solution is added to a solution of 3.78 parts of cyanuric chloride in 100 parts of acetone. At 0 to 2° C., while stirring well, 20 parts by volume of 1 N-sodium hydroxide solution are added dropwise, while the pH is kept between 5 and 7.0. On completion of the condensation, when no more free amino component can be detected, a neutral solution of 0.02 mol of copper-phthalocyanine-trisulfonic acid-monosulfonyl-N(para-aminophenyl)-amide in 500 parts of water is added, and the whole is immediately heated to 40° C. As described in connection with the first condensation, the pH value is maintained between 6 and 7 by the dropwise addition of 18 to 20 parts by volume of 1 N-sodium hydroxide solution. On completion of the condensation the dyestuff is salted out with sodium chloride from a solution weakly alkaline to brilliant yellow and dried in vacuo at 60 to 65° C.

The resulting dyestuff dyes cotton by the process described in Example 28 brilliant green tints which are so fixed as to be fast to washing.

By the chrome-printing method green prints are obtained on cotton.

*Example 17*

From 60 parts of copper-phthalocyanine the copper-phthalocyanine-sulfochloride is prepared as described in the 1st paragraph of Example 3. A quarter of the product thus obtained (about 0.025 mol) is stirred into a very fine paste with 50 parts of ice and adjusted at 0 to 3° C. with dilute sodium hydroxide solution at a pH of 7.5.

6.9 parts of 4:4'-diaminodiphenyl-3-sulfonic acid are dissolved in 200 parts of water with the addition of 26.5 parts by volume of 1 N-sodium hydroxide solution; this solution is added to the neutralized sulfochloride, and immediately 5 parts of calcined sodium carbonate are strewn in. The reaction mixture is stirred for 20 hours at 20° C., then heated up to 60 to 63° C. and stirred for some time at that temperature at a strong alkaline reaction to brilliant yellow. The alkalinity is brought down to 7.5 and the dyestuff is salted out with sodium chloride as completely as possible.

4.6 parts of cyanuric chloride are dissolved with heating in acetone, poured on to ice, isolated by filtration and suspended in chopped ice. While keeping this cyanuric chloride suspension stirred, it is mixed with a solution in 700 parts of water of the dyestuff described above. By adding dropwise 23 parts by volume of 1 N-sodium hydroxide solution at 4 to 6° C. the pH is maintained between 5 and 7.2. On completion of the condensation the dyestuff solution is mixed with 27.5 parts by volume of 2 N-ammonia solution, and the whole is heated for 2½ hours at 30 to 35° C. At a pH of 7.5 the dyestuff is salted out with sodium chloride and dried in vacuo at 50 to 55° C.

By the dyeing process described in Example 28 this dyestuff furnishes brilliant blue dyeings fast to washing.

*Example 18*

From 60 parts of pigment, copper-phthalocyanine-sulfochloride is prepared as described in the 1st paragraph of Example 3. Half of the product thus obtained (about 0.05 mol) is pasted with 75 parts of chopped ice and 75 parts of water and adjusted to pH=7.5 with dilute sodium hydroxide solution at 0 to 3° C. The sulfochloride suspension thus obtained is mixed with a suspension, rendered slightly alkaline to brilliant yellow, of 37 parts of the yellow monoazo dyestuff of the formula

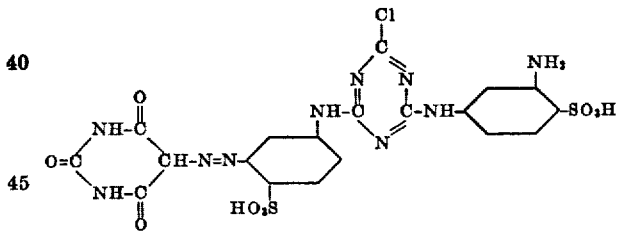

in 1000 parts of water. The reaction mixture is immediately heated to 30–33° C. while being thoroughly stirred. By strewing in in portions a total of 12 parts of calcined sodium carbonate the pH is kept from dropping below 7, the whole being stirred for 6 hours at 30 to 33° C. and then for 12 hours at room temperature and then heated to 35 to 38° C. When the reaction mixture has remained constant for 1 hour without any further sodium carbonate having been added, the dyestuff is salted out with sodium chloride at a pH of 7.7, and dried as usual.

In this manner a dyestuff is obtained which, by the dyeing process described in Examples 25, 26 and 28 dyes celllulose fibers brilliant bluish green tints fast to washing.

*Example 19*

60 parts of copper-phthalocyanine are converted into the sulfochloride as described in the 1st paragraph of Example 3. A quarter of the product thus obtained (about 0.025 mol) is stirred at 0 to 3° C. with 25 parts of water and 25 parts of ice and adjusted to pH=7.3 to 7.5 by means of dilute sodium hydroxide solution.

5.7 parts of 1-(3'-aminophenyl)-5-pyrazolone-3-carboxylic acid are dissolved in 15 parts by volume of pyridine and 30 parts of water, and this solution is thoroughly stirred into the neutralized sulfochloride. After 24 hours' reaction at room temperature the reaction mixture is treated with 50 parts by volume of saturated sodium chloride solution and in the cold rendered acid to Congo with 5 N-hydrochloride acid. The precipitated dyestuff is filtered off, suspended in water and heated at 60° C. in a solution of strongly alkaline reaction to brilliant yellow until any sulfochloride groups not previously hydrolyzed have been hydrolyzed. To remove the pyridine the alkaline solution is treated with steam, and at a pH of 7.3 the dyestuff is isolated as completely as possible with potassium chloride and saturated sodium chloride solution.

11.8 parts of the product of the formula

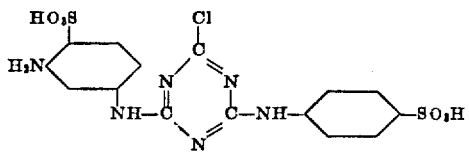

are stirred into a fine paste with 300 parts of water and ice and adjusted to pH=7.5 with 1 N-sodium hydroxide solution. 12.5 parts by volume of 2 N-nitrite are added to said solution, cooled to 5° C. and while it is being vigorously stirred 7.5 parts by volume of concentrated hydrochloric acid are tipped in. The mixture is stirred at 10 to 12° C. to complete the diazotisation, and the diazo component is added to an alkaline solution of the dyestuff described above in 200 parts by volume of water and 12 parts of calcined sodium carbonate. On completion of the coupling reaction the dyestuff is salted out with sodium chloride, washed with 200 parts of saturated salt water and dried in vacuo at 55 to 60° C.

The dyestuff thus obtined yields on cotton by the method described in Example 28, as well as by printing, yellowish green tints which are fast to washing.

*Example 20*

60 parts of copper-phthalocyanine are converted into the sulfochloride as described in the 1st paragraph of Example 3. Half of the product thus obtained (about 0.05 mol (is neutralized at 0 to 3° C. as described in the 1st paragraph of Example 4.

6.78 parts of monoacetyl-ethylene diamine are dissolved in 250 parts of water. While stirring the neutral sulfochloride suspension well, 11 parts of anhydrous sodium carbonate are strewn in, and the amine solution is added. The whole is stirred for 24 hours at 20 to 22° C. Hydrolysis is performed by adding 60 parts of sodium hydroxide (100%), the volume is made up to 1000 parts and the mixture heated for 2½ hours at 85 to 90° C. At 40° C. the alkalinity is adjusted with concentrated hydrochloric acid to pH=8.5, and the mixture is subjected to steam distillation to remove all amine volatile with steam. From the solution, which is weakly alkaline to brilliant yellow, the dyestuff can be isolated with sodium chloride. Half of the dyestuff thus obtained is dissolved in water, cooled to 0 to 2° C., and condensed with 4.6 parts of cyanuric chloride at 6–8° C., which has been precipitated from acetone with ice water, filtered and slurried with ice. The pH of the reaction solution is maintained at 5.5 to 7.5 by the dropwise addition of 25 parts of 1 N-sodiumhydroxide solution. On completion of the condensation 27.5 parts by volume of 2-N-ammonia-solution are added, and the mixture is heated for 2½ to 3 hours at 35 to 40° C. By adding a small amount of hydrochloric acid the alkalinity is brought down to 7.5, and the dyestuff is salted out with sodium chloride and dried at 55–60° C. in a water-jet vacuum.

The dyestuff prepared in this manner dyes cotton by the method described in Example 26 brilliant blue tints fast to washing.

*Example 21*

11.5 parts of cobalt-phthalocyanine are added to 115 parts of chlorosulfonic acid, and the mixture is stirred for 15 minutes at room temperature. The reaction mixture is then heated and stirred for 2 hours at 130 to 132° C. After cooling, the mixture is poured on to 56 parts of sodium chloride, 100 parts of water and 600 parts of chopped ice, filtered, and washed with a mixture of 120 parts by volume of saturated salt water and 60 parts of ice. The sulfochloride obtained in this manner is stirred into a very fine paste with 55 parts of ice and at 0–3° C. adjusted to pH 7.0 with dilute sodium hydroxide solution.

This sulfochloride paste is mixed with 5.0 parts of calcined sodium carbonate and almost simultaneously with a neutral suspension of 9.5 parts of 2-chloro-4-amino-6-(3'-aminophenyl)-amino-1:3:5-triazine-4' - sulfonic acid in 150 parts of water. The reaction mixture is stirred for 20 to 22 hours at room temperature, heated to 35 to 37° C. and maintained at that temperature for 2 hours. The dyestuff is isolated with sodium chloride at a pH value of 7.5 to 7.6.

The dyestuff obtained in this manner dyes cotton greenish blue tints by the method described in Example 26.

A similar dyestuff is obtained when 11.8 parts of nickel-phthalocyanine are used instead of the specified 11.5 parts of cobalt-phthalocyanine.

*Example 22*

15 parts of copper phthalocyanine are introduced with stirring into 135 parts of chlorosulfonic acid in such manner that the temperature does not exceed 30° C. Stirring is continued at room temperature for half an hour. In the course of an hour and half the temperature of the reaction mixture is raised to 130–133° C. and maintained at that level for 4 hours. The mixture is stirred until it is cold and then stirred into a mixture of 125 parts of water, 70 parts of sodium chloride and 750 parts of crushed ice. The mixture is stirred for a short while, filtered, and the filter residue washed on the filter with 150 parts by volume of saturated sodium chloride solution and 75 parts of ice. In this manner, a copperphthalocyanine-sulfochloride is obtained which is processed in the form of a moist, acid paste, and which very likely is a mixture of copper phthalocyanine-3,3',3''-trisulfochloride-3'''-sulfonic acid and the corresponding copperphthalocyanine-disulfochloride-disulfonic acid.

12.7 parts of 1-aminobenzene-2,5-disulfonic acid are dissolved in 100 parts of water and 2 N-sodium hydroxide solution added to form a neutral solution. The latter is cooled to 0° C. While stirring, a solution of 9.25 parts of cyanuric chloride in 40 parts by volume of acetone is added, and the temperature maintained at 0–5° C. by the simultaneous addition of crushed ice. The hydrochloric acid liberated during the condensation is neutralized by the addition of N-sodium hydroxide solution. The pH value should then be 6.5–7. When the condensation is finished, the reaction mass is heated and at a temperature of 25–35° C. a solution of 3 parts of ethylenediamine in 50 parts of water is stirred in dropwise, so that the pH is 7–7.3. When this addition is complete, 15 to 20% of sodium chloride are added and the reaction mass cooled to 10° C., the product precipitating in the form of fine, colorless needles. The crystal magma is stirred for 1 to 10 hours, filtered, and the filter cake washed with 25 parts of a cold 20% sodium chloride solution. There are obtained in this manner about 50 parts of a moist paste. The latter is suspended together with the copperphthalocyanine-sulfochloride paste described in the first paragraph in 400 parts of cold water, and the pH adjusted to 7 with 10 N-sodium hydroxide solution. The mixture is stirred, first for 1 hour at 20° C., then at 30–35° C., and about 10 parts of anhydrous sodium carbonate are strewed in in portions so that the pH value is at 7–9. Instead of sodium bicarbonate, other acid-binding agents can be used, such as sodium carbonate, sodium hydroxide, ammonium carbonate, or ammonia solution. When complete dissolution is attained, stirring is continued at 20° C. for several hours. The pH value is then adjusted to 7 with dilute hydrochloric acid, 20% sodium chloride are added, and stirring continued at 5 to 10° C. for several hours. The dyestuff is filtered off and dried under reduced pressure at 50 to 60° C. It dyes cellulose fibers brilliant blue tints that are fast to washing.

Similar dyestuffs are obtained when in the preparation of the aminochlorotriazine intermediate product there is condensed instead of the 1-aminobenzene-2,5-disulfonic acid one of the following compounds:

1-aminobenzene-4-sulfonic acid,
1-aminobenzene-3-sulfonic acid,
1-aminobenzene-2-sulfonic acid,
1-aminobenzene-2-carboxylic acid,
2-naphthylamine-4,8-disulfonic acid,
Monoaminoethylsulfonate ($H_2N-CH_2CH_2-OSO_3H$),
or when instead of ethylenediamine
1,3-propylenediamine or
1,6-hexamethylenediamine is condensed.

Example 23

From 60 parts of copper-phthalocyanine the sulfochloride is prepared as described in the first paragraph of Example 3. A quarter of the product thus obtained (about 0.025 mol) is stirred into a very fine paste, with 25 parts of water and 25 parts of ice, and the paste is well stirred and neutralized at 0–3° C. with cold sodium hydroxide solution of about 15 percent strength to attain a pH value of 7.3.

21.0 parts of the monoazo dyestuff of the formula

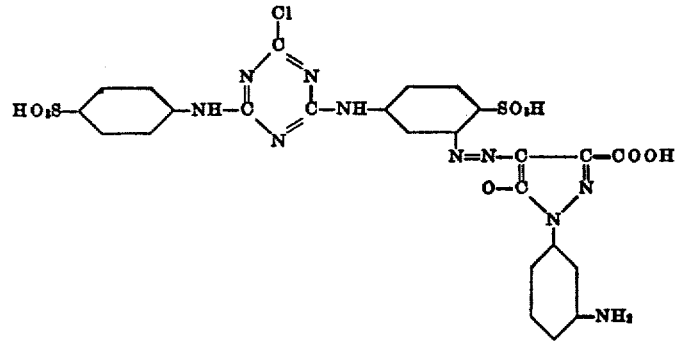

prepared by coupling in a solution, rendered alkaline with sodium carbonate, of diazotized 2-chloro-4-(4″-sulfophenylamino) - 6 - (4′ - sulfo - 3′ - amino) - phenylamino-1:3:5-triazine with 1-(3′-aminophenyl)-5-pyrazolone-3-carboxylic acid, are stirred with water into a fine paste of weakly alkaline reaction to brilliant yellow paper, the total volume amounting to 650 parts. This yellow component is added to the well-stirred neutralized sulfochloride, 2 parts of calcined sodium carbonate are strewn in, and the reaction mixture is immediately heated to 30–35° C. The pH value rapidly drops to 7.0, whereupon 1 part of sodium carbonate is added. When this amount of alkali has been consumed, another 1–1.5 part of sodium carbonate is added. Stirring is performed in all for 6–7 hours at 30–35° C. and then overnight at room temperature. When the pH has stabilized itself at 7.5 to 7.7, the dyestuff is isolated at 35° C. with sodium chloride from a solution of a weakly alkaline reaction to brilliant yellow and dried in vacuo at 60° C.

The resulting product dyes cotton by the method described in Example 26 yellowish green tints.

Example 24

49.2 parts of sodium copper-phthalocyanine-3,4′,4″,4‴-tetrasulfonate (0.05 mol) are introduced into 130 parts by volume of chlorosulfonic acid in such manner that the temperature does not exceed 30° C. Stirring is continued for half an hour, and the reaction mixture is then heated to an internal temperature of 80–83° C. in the course of 30–40 minutes. In the course of an hour, 55 parts by volume of thionyl chloride are added dropwise in such manner that the temperature does not fall below 70–72° C. When the addition is complete, the reaction mass is heated to 80–82° C. for 3 hours. After this, it is poured into a mixture of saturated sodium chloride solutions and so much ice that the temperature of the whole does not rise above 0° C. The sulfochloride is isolated by filtration and thoroughly washed on the filter with ice water to free it from mineral acid as completely as possible.

This sulfochloride is stirred with 250 parts of ice water to obtain a fine distribution and its pH adjusted in the cold to 7.0–7.5. To this neutralized sulfochloride paste is added an aqueous, ammoniacal solution of the secondary condensation product of cyanuric chloride of the formula

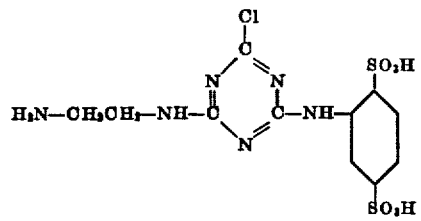

in the form of the monosodium salt. This solution is prepared by dissolving 44.7 parts (0.1 mol) of the monosodium salt of 2-chloro-4-(β-aminoethyl)amino-6-(2′,5′-disulfophenyl)-amino-1,3,5-triazine in 380 parts of water and adding 36 parts by volume of concentrated aqueous ammonia solution. The reaction mixture is stirred and its temperature allowed to rise slowly to 20–23° C. at which level the reaction is allowed to go to completion.

At 40–45° C. and a pH of 6.5–7, the resulting dyestuff is precipitated by the addition of potassium chloride and some saturated sodium chloride solution. It is then isolated by filtration and dried at 75–80° C. under reduced pressure.

The dyestuff so obtained dyes and prints cellulose fibers brilliant blue tints that are fast to washing.

Similar dyestuffs are obtained when the copper-phthalocyanine-3,4′,4″,4‴-tetrasulfonic acid chloride is condensed with 3 equivalents of the secondary condensation product from 1 mol of cyanuric chloride, 1 mol of 1-aminobenzene-2,5-disulfonic acid and 1 mol of ethylenediamine in the presence of an acid-binding agent, such as sodium carbonate, sodium hydroxide or ammonia.

Example 25

2 parts of the monochloro-triazine obtained as described in paragraphs 1–3 of Example 3 are dissolved with 80 parts of trisodium phosphate in 400 parts of water and made up to 4000 parts. 80 parts of sodium chloride are added, and 100 parts of a cotton fabric are entered in the dyebath thus prepared. In the course of ½ hour the temperature is raised to 60° C., another 80 parts of sodium chloride are added, the temperature is raised within 15 minutes to 80° C., and the whole is kept at that temperature for ½ hour. The blue dyeing thus obtained is then rinsed and soaped for 15 minutes in a boiling 0.3% solution of a non-ionogenic detergent; it has outstanding properties of fastness.

Example 26

1 part of the dyestuff obtained as described in paragraphs 1–3 of Example 4 is dissolved in 100 parts of water. This solution is used to impregnate at 80° C. a cotton fabric on the padder, and the excess moisture is squeezed off so that the fabric retains 75 percent of its own weight of the dyestuff solution. The impregnated fabric is dried and at room temperature impregnated with a solution containing per liter 10 grams of sodium hydroxide and 300 grams of sodium chloride, squeezed to a moisture content of 75% and steamed for 60 seconds at 100–101° C., then rinsed, treated with sodium bicarbonate solution of 0.5 percent strength, soaped for 15 minutes in 0.3% solution of a non-ionogenic detergent at the boil, rinsed and dried. A brilliant blue dyeing is obtained which is fast to washing at the boil.

Example 27

2 parts of the primary condensation product of phthalocyanine and cyanuric chloride obtained according to Example 1 are dissolved in 2000 parts of water, 100 parts of well-wetted cotton yarn are entered in this dyebath at 20 to 45° C. In the course of 30 minutes 500 parts of a 20% sodium chloride solution and 125 parts of a 10% sodium carbonate solution are added portionwise. After another 10 minutes 30 parts of a 10% sodium hydroxide solution are added, and dyeing is continued for another 60 minutes at 20 to 45° C. The dyeing so obtained is rinsed in cold water, soaped for 15 minutes at 85 to 100° C., thoroughly rinsed in cold water, and dried. A pure blue dyeing of very good fastness to light and washing is obtained.

Instead of sodium carbonate trisodium phosphate can be used with equally good results.

Example 28

3 parts of the dyestuff obtained as described in Example 19 and 2 parts of sodium carbonate are dissolved in 25 parts of urea and 75 parts of water. This solution is used to impregnate a cotton fabric, which is then squeezed to a 75 percent increment in weight and dried at 80° C.

The fabric is then exposed to dry heat at 140° C. for about 5 minutes, rinsed and soaped at the boil. A green dyeing is obtained which is fast to washing at the boil.

Example 29

30 parts of the dyestuff obtained as described in Example 6 are dissolved in 339 parts of water, 150 parts of urea are added, the mixture is introduced into a sodium alginate thickening, 30 parts of potassium carbonate and 1 part of a sodium hydroxide solution of 40 percent by volume strength are added. The printing paste thus obtained is used to print a cotton fabric in the usual manner and then dried, steamed for 5 minutes at 100–101° C., rinsed, soaped, once more rinsed and dried. A brilliant blue print is thus obtained.

Example 30

60 parts of copper-phthalocyanine are introduced into 280 parts by volume of chlorosulfonic acid. The mixture is heated within an hour and a half to 130–134° C. The mixture is stirred at that temperature for 4 hours. After cooling to 80° C., there are added dropwise in the course of 90 minutes 120 parts by volume of thionylchloride, so that the temperature does not fall below 68° C. Stirring is continued for another hour at 80–82° C. After cooling, the reaction mass is poured on to ice. The precipitated copper-phthalocyanine-polysulfochloride is filtered with suction and washed with ice water to remove the mineral acids.

The sulfochloride is stirred into 200 parts of water and 200 parts of ice. The resulting fine suspension is adjusted to pH 6.5–7.0 at 0–5° C. with dilute sodium hydroxide solution. To this sulfochloride paste is added a neutral solution of 38 parts of 1:3-diaminobenzene-4-sulfonic acid in 500 parts of water, and immediately afterwards 32 parts of anhydrous sodium carbonate. The reaction mixture is allowed to rise to room-temperature and is then heated for 24 hours at 30–35° C., finally for 2 hours at 60–70° C. By adding concentrated hydrochloric acid, the pH-value is adjusted to 4–5 and at 50–60° C. the dye precipitated with 250 parts of sodium chloride. The product is isolated by filtration and washed on the filter with 1000 parts by volume of a 12% sodiumchloride solution to which some drops of hydrochloric acid have been added.

The copper - phthalocyanine - 3-[N-3'-amino-4'-sulfophenyl]-sulfamide-3',3'',3'''-trisulfonic acid thus obtained is dissolved in 800 parts of water, and dilute sodium-hydroxide solution added to form a neutral solution. There is then added with stirring a solution of 18.7 parts of cyanuric chloride in 100 parts by volume of acetone and the temperature maintained between 7 and 10° C. The hydrochloric acid liberated during the condensation is neutralized by the dropwise addition of 2 N-sodium hydroxide solution at a pH of 5–7. When condensation is complete, there is added 25 parts by volume of 12.5 normal aqueous ammonia solution. The reaction mixture is heated for 2½–3 hours at 35–40° C. The dyestuff is isolated from the solution which has a weak alkaline reaction by salting out with 125 parts of potassium chloride.

The resulting dyestuff dyes cellulose fibers by the process described in Examples 26 and 28 blue tints fast to washing.

An intermediate with similar properties is obtained by using ammonia instead of sodium carbonate.

What is claimed is:

1. A water-soluble phthalocyanine dyestuff which contains at least two sulfonic acid groups and a 2-chloro-4-amino-1:3:5-triazine nucleus bound to the dyestuff molecule by its 6-position through a bridge of the formula

wherein A represents a monoazo dyestuff bound to each of the —NH-groups by a different benzene radical of its molecule.

2. A water-soluble phthalocyanine dyestuff which contains at least two sulfonic acid groups and a radical of the formula

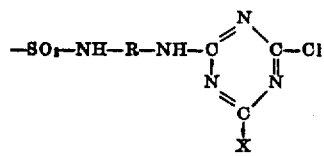

wherein R represents a member of the group consisting of the ethylene, propylene, hexylene and phenylene radicals and X represents the radical of an amino monoazo dyestuff bound by its amino group.

3. A water-soluble phthalocyanine dyestuff of the formula

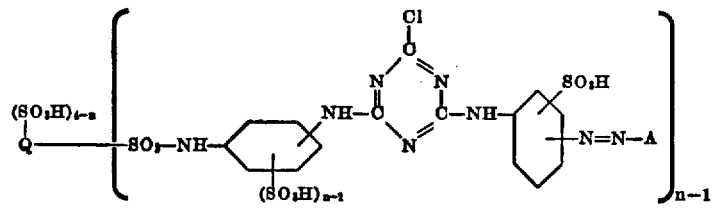

wherein Q represents the copper phthalocyanine radical, n is a whole positive number up to 2 and A is the radical of a heterocyclic coupling component having two nitrogen atoms in the heterocyclic nucleus.

4. A water-soluble phthalocyanine dyestuff of the formula $$Q\begin{smallmatrix}(SO_3H)_{t-n}\\SO_2-NH-A\end{smallmatrix}$$

wherein Q represents the copper phthalocyanine radical, n is a whole positive number up to 2 and A represents the radical of a pyrazolone monoazo dyestuff which contains at least two water-solubilizing groups and a 2-chloro-4-amino-1:3:5-triazine nucleus bound in its 6-position through a —NH-group to a benzene radical of the said monoazo-dyestuff.

5. The dyestuff of the formula

[structural formula]

wherein Q represents the copper phthalocyanine radical.

6. The dyestuff of the formula

[structural formula]

wherein Q represents the copper phthalocyanine radical.

7. Dyestuff of the formula

[structural formula]

wherein Q represents the copper-phthalocyanine radical, m is 0 to 1 and n is 2 to 3, m+n being at most 3, and W is a member of the group consisting of the —OH and the —NH$_2$ groups, the several substituents shown in the formula being attached to one of the positions 3 and 4 of the respective benzene nuclei of the phthalocyanine radical.

8. Dyestuff of the formula $$Q\begin{smallmatrix}(SO_3H)_m\\|\\-SO_2-D-R-N-Z\\|\\C_{n-1}H_{2n-1}\end{smallmatrix}$$

wherein Q is phthalocyaninyl, D is a member selected from the group consisting of —O— and —NH—, R is a member selected from the group consisting of at most bicyclic arylene and alkylene, n is a whole number up to 2, and Z is a 2-chloro-4-amino-1:3:5-triazine nucleus bound by its 6-position to the N-atom of the formula, the several substituents shown in the formula being attached to one of the positions 3 and 4 of the respective benzene nuclei.

9. Dyestuff as claimed in claim 8, wherein —D—R— stands for

—NH-alkylene-

10. Dyestuff as claimed in claim 8, wherein —D—R— stands for

—NH-phenylene-

11. Dyestuff as claimed in claim 8, wherein —D—R— stands for

[structural formula: —NH-phenylene-SO$_3$H]

12. Dyestuff as claimed in claim 8, wherein —D—R— stands for

—NH-ethylene-

13. Dyestuff as claimed in claim 8, wherein —D—R— stands for

—NH-propylene-

14. Dyestuff as claimed in claim 8, wherein —D—R— stands for

—NH-hexylene-

15. Dyestuff of the formula

[structural formula]

wherein Q is copper phthalocyaninyl, the several substituents shown in the formula being attached to one of the positions 3 and 4 of the respective benzene nuclei.

16. Dyestuff of the formula

[structural formula]

wherein Q represents copper phthalocyaninyl, the several substituents shown in the formula being attached to one of the positions 3 and 4 of the respective benzene nuclei of the phthalocyanine radical.

17. Dyestuff of the formula

[structural formula]

wherein Q is copper phthalocyaninyl, the several substituents shown in the formula being attached to one of the positions 3 and 4 of the respective benzene nuclei, X is sulfophenyl, $m$ is a whole number from 1 to 2, and $n$ is a whole number from 2 to 3, $m+n$ being at most 4.

References Cited in the file of this patent

UNITED STATES PATENTS

| | | |
|---|---|---|
| 1,886,480 | Haller et al. | Nov. 8, 1932 |
| 2,773,871 | Brassel et al. | Dec. 11, 1956 |
| 2,907,762 | Heslop | Oct. 6, 1959 |

FOREIGN PATENTS

| | | |
|---|---|---|
| 2630/57 | South Africa | Aug. 7, 1957 |
| 200,698 | Austria | Nov. 25, 1958 |
| 805,562 | Great Britain | Dec. 10, 1958 |
| 1,172,961 | France | Oct. 28, 1958 |

UNITED STATES PATENT OFFICE
CERTIFICATE OF CORRECTION

Patent No. 3,082,201                                March 19, 1963

Eugen Johann Koller

It is hereby certified that error appears in the above numbered patent requiring correction and that the said Letters Patent should read as corrected below.

Column 1, line 15, for "on" read -- one --; line 56, strike out "of"; column 2, line 27, for "cloride" read -- chloride --; column 3, line 8, for "metal-toluidine" read -- meta-toluidine --; line 24, for "aminoactic" read -- aminoacetic --; column 4, line 52, for "rised" read -- rises --; column 8, line 18, for "ph=7.0" read -- pH=7.0 --; column 15, line 32, for "obtined" read -- obtained --; line 40, for "mole (is" read -- mole) is --; column 17, lines 29 to 44, for that portion of the formula reading

Signed and sealed this 24th day of December 1963.

(SEAL)
Attest:

ERNEST W. SWIDER                            EDWIN L. REYNOLDS
Attesting Officer                     Acting Commissioner of Patents